Patented June 22, 1926.

1,589,803

UNITED STATES PATENT OFFICE.

FRITZ HÄRING, OF GEISSELROEHLITZ, BEZIRK HALLE, GERMANY, ASSIGNOR TO FREYN ENGINEERING COMPANY, OF CHICAGO, ILLINOIS, A CORPORATION OF MAINE.

MEANS FOR CLEANING BLAST-FURNACE GASES.

No Drawing. Application filed August 26, 1921, Serial No. 495,785, and in Germany September 11, 1914.

The present invention relates to improvements in means for cleaning blast furnace gases.

An object of the present invention is to provide improved means whereby blast furnace gases may be cleaned in a dry manner.

Further objects will appear as the description proceeds.

The known methods of cleaning blast furnace gases by a wet process whereby the gases are cleaned by intimate mixture with water and separation of the water containing the flue dust, have the disadvantage that on account of the mixture of the gases with water the eliminated flue dust cannot be utilized direct for briquetting, and, on the other hand, there occurs a strong refrigeration of the gases so that the utilization of their sensible heat for heating stoves or steam boilers is uneconomical.

Moreover, the space required by the wet washers is great on account of the necessary arrangement of the contrivances serving the mixture with the water and the separation of the latter. Further, the use of a larger number of cleaning out doors is necessary, because there are several raw gas mains leading up and down between the blast furnace and the clean gas main.

Similar disadvantages are offered by the processes heretofore in use for dry cleaning of the blast furnace gas. On account of the use of jute or similar materials for the filters it is necessary to pre-cool the gases to avoid charring or breaking of the filters and afterwards it is necessary to reheat the gases in order to vaporize the water if the flue dust is to be separated in a dry state on the filters. The direct use of the separated flue dust for briquetting purposes is therefore impossible in this case as well; the temperature of the clean gas is comparatively low and the use of special devices between blast furnace and clean gas main is necessary. While maintaining a thorough cleaning of the blast furnace gases, these difficulties or disadvantages are avoided in this invention by using metal filters inserted in the gas mains leading from the blast furnaces, which metal filters are filled with fine long metal turnings, known as steel wool. Since the metal filter is not affected by the high temperature of the furnace gases, an elimination of the flue dust from the hot gases is possible as is the insertion of the filters in closest proximity of the blast furnace. By using fine, long metal turning as a filter medium, it is being accomplished that the filter can be made sufficiently dense to insure a thorough elimination of the finest flue dust. The flue dust is therefore eliminated in a dry state without previous cooling or reheating of the gases and is suitable direct for briquetting, while on account of the elimination of the cooling of the raw gas, the temperature of the clean gas and hence the efficiency of hot blast stoves, heat regenerators or steam boilers which are heated by the blast furnace gases are higher. Owing to the elimination of special auxiliary devices between blast furnace and clean gas main, the space required by the cleaning plant is considerably reduced and its maintenance simplified since the cleaning of long gas mains from deposited flue dust is saved. As an example, there is used for the filter for the cleaning of the furnace gases a frame made of metal capable of resisting the high temperatures which occur. This may suitably be iron whereby the faces are formed by large wire mesh screens. The filtering medium are fine long steel turnings, the thickness and density of which are so adjusted to the operating condition that on the one hand the fine flue dust is prevented from passing while on the other hand the cleaned gases can pass.

The filter is inserted close to the furnace, for instance, behind the first dust catcher, and is put gas tight into the raw gas main, whereby care is taken to remove the flue dust retained by the filter out of the path of the gases by arranging for a dust collecting vessel before the filter. The filters are suitably arranged to be easily exchanged so that they may be cleaned after a certain length of operation and replaced by fresh filters. It is also recommended to subdivide the gas main at the point of insertion of the filters so as to facilitate by the reduction in the dimensions of the filter its handling while changing and cleaning it.

What I claim as new and desire to secure by Letters Patent in the United States, is:

1. A filtering medium for mechanically extracting dust from hot furnace gases consisting of a matted body of steel threads.

2. A filtering medium for mechanically extracting dust from hot furnace gases consisting of a body of steel wool.

Signed at Berlin, Germany, this fifth day of August, 1921.

FRITZ HÄRING.